US008780800B2

(12) United States Patent
Bachmann et al.

(10) Patent No.: US 8,780,800 B2
(45) Date of Patent: Jul. 15, 2014

(54) OPTIMIZED HOME LINK DETECTION

(75) Inventors: Jens Bachmann, Oberursel (DE); Kilian Weniger, Lehre (DE); Genedi Velev, Darmstadt (DE)

(73) Assignee: Panasonic Corporation, Osaka (JP)

( * ) Notice: Subject to any disclaimer, the term of this patent is extended or adjusted under 35 U.S.C. 154(b) by 262 days.

(21) Appl. No.: 13/133,625

(22) PCT Filed: Oct. 28, 2009

(86) PCT No.: PCT/EP2009/007716
§ 371 (c)(1),
(2), (4) Date: Aug. 23, 2011

(87) PCT Pub. No.: WO2010/072282
PCT Pub. Date: Jul. 1, 2010

(65) Prior Publication Data
US 2011/0299463 A1 Dec. 8, 2011

(30) Foreign Application Priority Data
Dec. 23, 2008 (EP) .................................... 08022384

(51) Int. Cl.
*H04W 4/00* (2009.01)
*G06F 15/16* (2006.01)
*H04W 8/06* (2009.01)
*H04W 8/04* (2009.01)
*H04W 80/04* (2009.01)
(52) U.S. Cl.
CPC ................ *H04W 8/065* (2013.01); *H04W 8/04* (2013.01); *H04W 8/06* (2013.01); *H04W 80/045* (2013.01)
USPC .......................................... 370/328; 370/401

(58) Field of Classification Search
None
See application file for complete search history.

(56) References Cited

U.S. PATENT DOCUMENTS

| 7,916,721 | B1* | 3/2011 | Breau et al. .................... 370/389 |
| 2006/0171370 | A1* | 8/2006 | Matsumoto et al. ........... 370/351 |
| 2007/0177550 | A1* | 8/2007 | Kwon et al. .................... 370/331 |
| 2007/0268919 | A1* | 11/2007 | Sarikaya et al. ............... 370/401 |
| 2009/0109986 | A1* | 4/2009 | Zhao et al. .................... 370/401 |

OTHER PUBLICATIONS

3GPP TS 23.401 V8.3.0, "General Packet Radio Services (GPRS) enhancements Evolved Universal Terrestrial Radio Access Network (E-UTRAN) access (Release 8)," Nov. 25, 2008, pp. 1-38.

(Continued)

*Primary Examiner* — Kevin C Harper
*Assistant Examiner* — Peter Chen
(74) *Attorney, Agent, or Firm* — Dickinson Wright PLLC

(57) ABSTRACT

The invention relates to a method for establishing by a mobile node an additional session via a connection to a packet data network in a mobile communication network and a mobile node and a packet data network gateway adapted to perform this method. In order to suggest optimized home link detection by a mobile node one aspect of the invention is to delay the decision on whether the mobile node is located on the home link or not. In conventional home link detection, the mobile node checks before sending any binding update on an access interface whether its prefix of the local IP address configured on that access interface is matching a home address prefix received during bootstrapping. According to one aspect of the invention, this home link detection is delayed in that home link detection is based on comparing a home address prefix received during bootstrapping and the advertised local prefix of a router advertisement received after bootstrapping.

18 Claims, 5 Drawing Sheets

(56) References Cited

OTHER PUBLICATIONS

3GPP TS 23.402 V8.3.0, "3rd Generation Partnership Project; Technical Specification Group Services and System Aspects; Architecture enhancements for non-3GPP accesses (Release 8)," Sep. 2008, pp. 1-190.
D. Johnson, et al., "Mobility Support in IPv6," IETF RFC 3775, Jun. 2004, pp. 1-165.
H. Soliman, "Mobile IPv6 Support for Dual Stack Hosts and Routers," IETF Internet Draft, draft-ietf-mext-nemo-v4traversal-06.txt, Nov. 3, 2008, pp. 1-50.
S. Gundavelli, et al., "Proxy Mobile IPv6," Internet Engineering Task Force Standard, IETF Standard, RFC 5213, Aug. 1, 2008, pp. 1-92.
K. Leung et al., "WiMAX Forum/3GPP2 Proxy Mobile IPv4," IETF Internet Draft, draft-leung-mip4-proxy-mode-09.txt, Jul. 31, 2008, pp. 1-42.
C. Perkins, "IP Mobility Support for IPv4," IETF RFC 3344, Aug. 2002, pp. 1-99.
H. Soliman, et al., "Mobile IPv6 support for dual stack Hosts and Routers (DSMIPv6)," IETF Internet Draft, draft-ietf-mip6-v4traversal-06.txt, Nov. 2007, pp. 1-28.
3GPP TS 23.234 V7.7.0, "3rd Generation Partnership Project; Technical Specification Group Services and System Aspects; 3gpp system to Wireless Local Area Network (LAN) interworking; System description (Release 7)," Jun. 2008, pp. 1-85.
J. Arkko, et al., "Extensible Authentication Protocol Method for 3rd Generation Authentication and Key Agreement (EAP-AKA)," IETF RFC 4187, Jan. 2006, pp. 1-79.
G. Giaretta, et al., "Mobile IPv6 Bootstrapping in Split Scenario," IETF RFC 5026, Oct. 2007, pp. 1-28.
International Search Report dated Jan. 6, 2010.
European Search Report dated May 4, 2009.
Gundavelli, et al., "Proxy Mobile IPv6," Internet Engineering Task Force Standard, IETF Standard, RFC 5213, Aug. 1, 2008, pp. 1-92.
3GPP TS 23.402 V8.4.0, "3rd Generation Partnership Project; Technical Specification Group Services and System Aspects; Architecture enhancements for non-3GPP accesses (Release 8)," Dec. 16, 2008, pp. 1-190.
Marvel, "Support for handover with multiple PDNs in TS 23.402," 3GPP TSG-SA2 Meeting #65, S2-084292, May 19, 2006, pp. 1-8.
C. Wan, et al., "The bootstrapping for Proxy mobile IPv6; draft-wan-netimm-pmip-bootstrapping-00.txt," Internet Engineering Task Force, IETF Standard-Working-Draft, Jul. 20, 2007, pp. 1-14.
V. Devarapalli, et al., "Mobile IPv6 Operation with IKEv2 and the Revised IPsec Architecture," Internet Engineering Task Force, IETF Standard, RFC 4877, Apr. 1, 2007, pp. 1-26.
T. Narten, et al., "Neighbor Discovery for IP version 6 (IPv6)," Internet Engineering Task Force, IETF Standard, RFC 4861, Sep. 1, 2007, pp. 1-97.
G. Giaretta, "Interactions between PMIPv6 and MIPv6: scenarios and related issues; draft-giaretta-netlmm-mip-interactions-02.txt," Internet Engineering Task Force, IETF Standard-Working-Draft, Nov. 15, 2007, pp. 1-20.

\* cited by examiner

OPTIMIZED HOME LINK DETECTION

FIELD OF THE INVENTION

The invention relates to a method establishing by a mobile node an additional session via a connection to a packet data network in a mobile communication network thereby using optimized home link detection. The optimized home link detection can also be used when establishing a first session. Furthermore, the invention relates to a packet data network gateway, a communication system and computer readable media that are suitably adapted or programmed to implement optimized home link detection.

TECHNICAL BACKGROUND

UMTS (Universal Mobile Telecommunications System) is the 3G (3rd Generation) mobile communication system standardized by 3GPP (3rd Generation Partnership Project). The 3GPP launched a study item "Evolved UTRA and UTRAN" better known as "Long Term Evolution (LTE)". The study investigates means of achieving major leaps in performance in order to improve service provisioning, and to reduce user and operator costs. in view of these studies and in order to enable interworking with other radio access technologies, the need arose for the definition of a new Evolved Packet Core (EPC) network. For further details, please see 3GPP TS 23.401, "General Packet Radio Service (GPRS) enhancements for Evolved Universal Terrestrial Radio Access Network (E-UTRAN) access", version 8.3.0 and 3GPP TS 23.402, "Architecture enhancements for non-3GPP accesses", version 8.3.0, both documents available at http://www.3gpp.org and incorporated herein by reference.

An exemplary representation of the E-UTRAN architecture of LTE is shown in FIG. 1. In the following, the most important entities in this architecture are explained to facilitate a better understanding of the invention described herein.

The E-UTRAN consists of evolved Node Bs (eNBs or eNode Bs), providing the E-UTRA user plane (PDCP/RLC/MAC/PHY) and control plane (RRC) protocol terminations towards the mobile node. The eNodeB hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated UL QoS, cell information broadcast, ciphering/deciphering of user and control plane data, and compression/decompression of DL/UL user plane packet headers.

The eNode Bs are interconnected with each other by means of the X2 interface. The eNode Bs are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MMEs/Serving Gateways and eNode Bs.

The Serving Gateway routes and forwards user data packets, while also acting as the mobility anchor for the user plane during inter-eNodeB handovers and as the anchor for mobility between LTE and other 3GPP technologies (terminating the S4 interface and relaying the traffic between 2G/3G systems and PDN-GW). For idle state UEs, the Serving Gateway terminates the downlink data path and triggers paging when downlink data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the Serving Gateway for a UE at the initial attach and at time of intra-LTE handover involving Core Network (CN) node relocation. It is responsible for authenticating the user (by interacting with the Home Subscriber Server, HSS). It checks the authorization of the UE to camp on the service provider's Public Land Mobile Network (PLMN) and enforces UE roaming restrictions. The MME is the termination point in the network for ciphering/integrity protection for Non-Access Stratum (NAS) signaling and handles the security key management. The MME also provides the control plane function for mobility between LTE and 2G/3G access networks with the S3 interface terminating at the MME from the SGSN (Serving GPRS Support Node). The MME also terminates the S6a interface towards the home HSS for roaming UEs.

The Packet Data Network Gateway (PDN-GW) provides connectivity for the UE to external packet data networks by being the point of exit and entry of traffic for the UE. A UE may have simultaneous connectivity with more than one Packet Data Network Gateway for accessing multiple Packet Data Networks (PDNs). The Packet Data Network Gateway performs policy enforcement, packet filtering for each user, charging support, lawful Interception and packet screening. Another key role of the Packet Data Network Gateway is to act as the anchor for mobility between 3GPP and non-3GPP technologies.

To summarize the architecture depicted in FIG. 1, the new 3GPP Core Network is mainly separated into three logical entities in order to support the new E-UTRAN access. In the user plane, the Packet Data Network Gateway (PDN-GW) is the gateway to the external networks and the global mobility anchor for mobility between 3GPP and non-3GPP access technologies (for example, CDMA 2000, WiMAX or WIFI). Also in the user plane, the Serving Gateway can be considered the mobility anchor for mobility between 3GPP accesses (E-UTRAN, UTRAN, GERAN). The Mobility Management Entity (MME) is the control plane entity responsible for the mobility management of UEs (also referred to in the following as mobile nodes, mobile nodes or MNs) moving between different E-UTRAN base stations (eNode Bs) and for the session management.

Another aspect of LTE is the support of 3GPP accesses (e.g. GERAN, UTRAN, E-UTRAN), non-3GPP accesses (e.g. WLAN, WiMAX, 3GPP2, etc.) and mobility between those different types of access, i.e. in a heterogeneous network. The anchor for the mobility between the 3GPP and the non-3GPP accesses is a Packet Data Network Gateway that also provides the interface to the external Packet Data Networks. The mobility between 3GPP and non-3GPP accesses is based on Mobile IP—the protocol used can be either Client Mobile IP (see Johnson et al., "Mobility Support in IPv6", IETF RFC 3775, June 2004 and Soliman et al., "Mobile IPv6 Support for Dual Stack Hosts and Routers", IETF Internet Draft, draft-ietf-mext-nemo-v4traversal-06.txt, November 2008, both documents available at http://www.ietf.org and incorporated herein by reference) or Proxy Mobile IP (see Gundavelli et al., "Proxy Mobile IPv6", IETF RFC 5213, August 2008 and Leung et al., "WIMAX Forum/3GPP2 Proxy Mobile IPv4", IETF Internet Draft, draft-leung-mip4- proxy-mode-09.txt, July 2008, both documents available at http://www.ietf.org and incorporated herein by reference).

As described above, the mobility management entity (MME) is responsible for mobility management and session management. For each mobile node attached to an MME, specific mobility management and evolved packet system context information is stored in the MME. These contexts comprise, e.g. the mobility state, the temporary identity, the current Tracking Area List, last known cell, authentication vectors, access restrictions, subscribed QoS profile, subscribed charging characteristics, and for each active PDN connection the APN (Access Point Name) in use, IPv4/IPv6 addresses, PDN-GW address for control plane, and also information for each EPS (Evolved Packet System) bearer within the PDN connection, as for example EPS bearer QoS profile, EPS bearer charging characteristics.

The mobility management within the 3GPP system is network controlled, and two protocol variants are standardised for the interface between the PDN-GW and the Serving GW. One is based on GTP (GPRS Tunneling Protocol), the protocol used in the legacy GPRS (General Packet Radio Service) system, and the other one is Proxy Mobile IPv6 developed in the Internet Engineering Task Force (IETF)—see Gundavelli et al., "Proxy Mobile IPv6", IETF RFC 5213, August 2008, available at http://www.ietf.org and being incorporated herein by reference. For interworking with non-3GPP access networks, the mobile node can be connected to the 3GPP core network, i.e. the PDN-GW, via PMIPv6 as well, in case the non-3GPP access supports PMIPv6. Alternatively, if the mobile node does not support inter-access handover with PMIPv6 or if the non-3GPP access does not support PMIPv6, the mobile node can be connected to the 3GPP core network via Client Mobile IP, e.g. Mobile IPv4 in Foreign Agent Mode. (see Perkins, "IP Mobility Support for IPv4", IETF RFC 3344, August 2002, available at http://www.ietf.org and incorporated herein by reference) or Dual Stack Mobile IPv6 (DSMIPv6—see H. Soliman, "Mobile IPv6 support for dual stack Hosts and Routers (DSMIPv6)", IETF Internet Draft, draft-ietf-mip6-nemo-v4traversal-06.txt, November, 2007, available at http://www.ietf.org and incorporated herein by reference).

The non-3GPP accesses are separated into trusted accesses and untrusted accesses. The assumption for untrusted accesses is that a mobile node in an untrusted access needs first a secure tunnel (based on IPsec) to an evolved Packet data network gateway (ePDG) before being able to access operator services, i.e. the packet data network. The ePDG is similar to the PDG used for Interworking WLAN (as described in 3GPP TS 23.234, "3GPP system to Wireless Local Area Network (WLAN) interworking; System description", version 7.7.0, August 2008, available at http://www.3gpp.org and incorporated herein by reference). For trusted accesses, a secure tunnel is not needed.

Before a mobile node can access a trusted or untrusted non-3GPP access network, access authentication is performed. If 3GPP based access authentication is applied in the non-3GPP access, i.e. the 3GPP AAA server/HSS authenticates the mobile node, EAP-AKA is used (see Arkko et at, "Extensible Authentication Protocol Method for 3rd Generation Authentication and Key Agreement (EAP-AKA)", IETF RFC 4187, August 2006, available at http://www.ietf.org and incorporated herein by reference).

When the mobile node is active in a non-3GPP access network, there a local IP address is used to route packets to the mobile node in the non-3GPP access. This IP address is the care-of address (CoA) using the terminology of Mobile IP (MIP). In case of DSMIPv6, the address is assigned to the mobile node, and the mobile node is sending binding updates using its care-of address to the PDN-GW, which has the function of the home agent (HA). In case of PMIPv6, the care-of address is an address of a mobile access gateway (MAG) that is located in the non-3GPP access network or in the ePDG, and the MAG is sending proxy binding updates using its (proxy-)care-of address to the PDN-GW of the 3GPP network, which has the function of the local mobility anchor (LMA).

For mobility within the same or between different non-3GPP accesses similar mechanisms can be used as for mobility between 3GPP and non-3GPP accesses, i.e. Client or Proxy Mobile IP.

As will be outlined in the following below, the setup of multiple sessions with connections to different packet data networks is time consuming due to the mobile node's home link detection. This will be explained in the following using the exemplary scenario shown in FIG. 2.

A mobile node attaches 2001 to a non-3GPP access and establishes 2002 a connection to a PDN 1 through a PDN-GW 201. During the attach procedure the mobile node receives 2003 a prefix 1 in the non-3GPP access that can be either a foreign prefix (advertised from an access router) or a home prefix (e.g. advertised from MAG 203). During the attach procedure the mobile node has not received any information whether the prefix is a foreign prefix or a home prefix, neither during access authentication nor with DHCP nor access specific procedures nor extensions of router advertisements. Therefore the mobile node performs home link detection, by DSMIPv6 bootstrapping with PDN-GW 201 (see G. Giaretta et al., "Mobile IPv6 Bootstrapping in Split Scenario", IETF RFC 5026, October 2007, available at http://www.ietf.org and incorporated herein by reference). During bootstrapping the mobile node receives the home prefix assigned by PDN GW 201. The mobile node compares the prefix locally assigned in the non-3GPP access with the prefix received during bootstrapping.

After the connection to PDN 201 is established, the mobile node wants to set up an additional connection to a PDN 202 via a PDN-GW 2. According to the 3GPP Release 8 specification of 3GPP TS 23.402, "Architecture enhancements for non-3GPP accesses (Release 8)", version 8.3.0, September 2008 (available at http://www.3gpp.org and incorporated herein by reference), a mobile node located in non-3GPP access network cannot be on a home link for one PDN connection and on a foreign link for another PDN connection. In this scenario, this restriction is not obeyed, i.e. the prefix advertised for one PDN connection can be a home prefix and the prefix advertised for another PDN connection can be a foreign prefix.

In this case, in order to establish the additional PDN connection, the mobile node can use the DSMIPv6 bootstrapping to bootstrap with PDN-GW 202. This is possible because the mobile node already has at least one IP address from the PDN connection to PDN 1. Therefore, the address used as local IP address for DSM1Pv6 bootstrapping with the PDN-GW 202 can be either a foreign IP address from the non-3GPP access, which is also used as CoA for the PDN-GW 201 connection, for example, if the UE is not on home link for the PDN 1 connection, or the local IP address used for bootstrapping can be the home address (HoA) from the PDN-GW 201.

However, in both cases the local IP address can not be equal to the home address 2 assigned by PDN-GW 202, even in case home link would be possible in the non-3GPP access for the PDN-GW 2 connection (i.e, PMIP tunneling between non-3GPP access and PDN-GW is supported), because the local IP address is already assigned before the establishment of the connection to PDN-GW 202 is initiated and the home address 2 is allocated. The local IP address is used as care-of address, i.e. the mobile node sends a binding update to PDN-GW 202, and always DSMIPv6 with bi-directional tunneling is used (see FIG. 3). Therefore, the mechanism adds unnecessary overhead (IP-in-IP tunneling to PDN-GW 202).

SUMMARY OF THE INVENTION

One object of the invention is to suggest optimized home link detection by a mobile node. A further object of the invention is to allow the mobile node to use different mobility management schemes for different sessions via different packet data networks (so-called PDN connections in the 3GPP terminology).

The object is solved by the subject matter of the independent claims. Advantageous embodiments of the invention are subject matters of the dependent claims.

One aspect of the invention is to optimize the home link detection of a mobile node (i.e. user equipment or UE in the 3GPP terminology) by delaying the decision on whether the mobile node is located on the home link or not. As described above, in conventional home link detection, the mobile node checks before sending any binding update on an access interface whether its prefix of the local IP address configured on that access interface is matching a home address prefix received during bootstrapping. According to one aspect of the invention, this home link detection is delayed in that home link detection is based on comparing a home address prefix received during bootstrapping and the advertised local prefix of a router advertisement received after bootstrapping.

In accordance with this aspect of the invention and according to an embodiment of the invention, a method for establishing an additional session via a connection to a packet data network in a mobile communication network is provided. In this method a mobile node is bootstrapping with a mobility anchor for the additional session (additional PDN connection), e.g. a packet data network gateway to thereby obtain a home address prefix from the packet data network gateway. This bootstrapping is for example performed in response to a trigger to establish the additional session via the packet data network connection. The packet data network gateway connects the mobile node to the packet data network. Furthermore, the mobile node uses an IP address configured at the mobile node prior to the trigger to establish the session as its identifier during bootstrapping.

Assuming that a network based mobility scheme is used in the access network for the additional session, the obtained home address prefix should not match the prefix of the IP address used during bootstrapping, so that an IP address configured to the home address prefix would be topologically incorrect in the current access network. Therefore, the mobile node tunnels IP data packets of the additional session to the packet data network gateway using the IP address configured at the mobile node prior to the trigger to establish the session as the source address of the IP header encapsulating the IP data packets of the additional session.

The mobile node further receives a router advertisement from an access router. Assuming that a network based mobility scheme is used, the access router can be assumed to implement functionality of a mobile access gateway (MAG) and the router advertisement can be assumed to advertise an address prefix identical to the home address prefix obtained by the mobile node through bootstrapping with the packet data network gateway so that the mobile node is now aware of being on a home fink. In response to receiving the router advertisement, the mobile node can therefore transmit IP data packets of the additional session to the packet data network gateway using a home address configured according to the home address prefix as the source address of the IP data packets of the session (i.e. de-registers the DSMIPv6 binding at the serving packet data network gateway for the session and stops tunnelling of the IP data packets).

In a variation of this embodiment of the invention the mobile node configures at an interface the IP address according to a local prefix advertised in a router advertisement prior to the trigger to establish the session. In another variation of the embodiment the mobile node checks whether the prefix of the IP address configured at the mobile node prior to the trigger to establish the connection and being used for bootstrapping is matching the home address prefix obtained from the packet data network gateway during bootstrapping—as explained above, this should not be the case—and the tunnelling of the IP packets of the session is only performed, if the prefix of the IP address configured at the mobile node prior to the trigger to establish the connection is not matching the home address prefix obtained from the packet data network gateway during bootstrapping.

In a further embodiment of the invention, the bootstrapping procedure includes an IKEv2 signalling procedure to establish a security association between the mobile node and the packet data network gateway for tunnelling the IP data packets of said additional session between the mobile node and the packet data network gateway. The IKEv2 signalling procedure, respectively some of the messages exchanged therein, is for example modified so that the mobile node is receiving the home address prefix from the packet data network gateway as part of the IKEv2 signalling procedure.

In a further embodiment of the invention, the bootstrapping comprises transmitting from the mobile node information on the access network to which the mobile node is currently attached to the packet data network gateway. For example, if the bootstrapping includes an IKEv2 signalling procedure, this information could be included in one of the signalling messages sent by the mobile node.

In a variation of the embodiment, the packet data network gateway can identify an access router implementing functionality of a mobile access gateway in the access network and requesting the access router to advertise the home address prefix to the mobile node in said router advertisement. If the access router supports network-based mobility and can serve the mobile node as a proxy, the access router transmits a proxy binding update to the packet data network gateway to register the access router's IP address as a proxy care-of address for the mobile node's home address prefix at the packet data network gateway.

In another embodiment of the invention, the mobile node is registering the IP address configured at the mobile node prior to the trigger to establish the connection as its care-of address at the packet data network gateway in response to determining that the prefix of the IP address is not matching the home address prefix obtained from the packet data network gateway. As the prefix of the IP address is not matching the home address prefix, the mobile node assumes (prior to receiving a router advertisement advertising the home address prefix) that it is located on a foreign link, i.e. an IP address configured according to the home address prefix could not be used for communication on the foreign link. Accordingly, the mobile node assumes that a client-based mobility scheme is to be used and registers its local IP address of the access interface as the care-of address for the IP address configured according the home address prefix at the packet data network gateway (that is acting as the mobile node's home agent).

In a further exemplary embodiment of the invention, it is assumed that the mobile node has established a session via another connection to another packet data network (i.e. another PDN connection) prior to obtaining said trigger to establish an additional session. Furthermore, a client-based mobility management scheme is used for said session via said another packet data network connection and a network-based mobility management scheme is used for this other PDN connection.

In the exemplary embodiments described above, an advertised prefix has been matched with the home address prefix from the packet data network gateway in order to determine, whether the mobile node is on a home link or not. It should be noted that according to alternative embodiments of the invention, other mechanisms could be used to indicate to the mobile node, whether it is on the home link for the home address prefix or not. Accordingly, another embodiment of the invention relates to a method for establishing by a mobile node an additional session via a connection to a packet data network in a mobile communication network, in which the mobile node, in response to trigger to establish the additional session via the packet data network connection, bootstraps with a packet data network gateway to thereby obtain an home address prefix from the packet data network gateway. Again, the mobile node uses an IP address configured at the mobile node prior to the trigger to establish the session as its identifier during bootstrapping. The mobile node further receives an indication whether the home address prefix obtained from the packet data network gateway can be used in the access network to which the mobile node is attached. If the IP address configured according to the home address prefix obtained from the packet data network gateway cannot be used in the access network, i.e. the mobile node is not on the home link for the home address prefix, the mobile node is tunnelling IP data packets of said additional session to the packet data network gateway using the IP address configured for the mobile node as the source address of the IP header encapsulating the IP data packets of the additional session. If the IP address configured according to the home address prefix obtained from the packet data network gateway can be used in the access network, i.e. the mobile node is on the home link for the home address prefix, the mobile node transmits IP data packets of said additional session to the packet data network gateway using a home address configured according to the home address prefix as the source address of the IP data packets of the additional session.

In one example, the indication whether the home address prefix obtained from the packet data network gateway can be used in the access network is received as part of a message received by the mobile node during bootstrapping or as part of a message received by the mobile node when performing access network specific signalling to establish the additional session.

Another embodiment of the invention relates to a mobile node for establishing an additional session via a connection to a packet data network in a mobile communication network. The mobile node comprises a transmitter and a receiver (which could be included in a communication unit) for bootstrapping with a packet data network gateway in response to trigger to establish the additional session via the packet data network connection to thereby obtain an home address prefix from the packet data network gateway. In this bootstrapping procedure, the mobile node uses an IP address configured at the mobile node prior to the trigger to establish the session as its identifier. The transmitter is adapted to tunnel IP data packets of said additional session to the packet data network gateway using the IP address configured at the mobile node prior to the trigger to establish the session as the source address of the IP header encapsulating the IP data packets of the additional session. Furthermore, the receiver of the mobile node is adapted to receive a router advertisement from an access router that is advertising an address prefix identical to the home address prefix obtained by the mobile node through bootstrapping with the packet data network gateway. In response to this router advertisement, the transmitter transmits IP data packets of said additional session to the packet data network gateway using a home address configured according to the home address prefix as the source address of the IP data packets of the session (and stops tunnelling of the IP data packets).

In another exemplary embodiment of the invention, mobile node further comprises a processor unit for checking whether the prefix of the IP address configured at the mobile node prior to the trigger to establish the connection and being used for bootstrapping is matching the home address prefix obtained from the packet data network gateway during bootstrapping and the transmitter is adapted to tunnel the IP packets of the session to the packet data network gateway, only if the prefix of the IP address configured at the mobile node prior to the trigger to establish the connection is not matching the home address prefix obtained from the packet data network gateway during bootstrapping.

In a further embodiment of the invention the transmitter is adapted to transmit information on the access network to which the mobile node is currently attached to the packet data network gateway during bootstrapping.

Generally, it should be noted that the present invention also relates to a mobile node, packet data network gateway and other network nodes that are adapted to perform or participate in the methods according to the different embodiments of the invention described herein.

In this respect, the invention according to a further embodiment also provides a packet data network gateway for connecting a mobile node to a packet data network. The packet data network gateway comprises a transmitter and a receiver for bootstrapping with the mobile node, and a processing unit for determining, during bootstrapping, a home address prefix for the mobile node. The transmitter is adapted to transmit the home address prefix to the mobile node during bootstrapping, while the receiver is adapted to receive information on the access network to which the mobile node is currently attached during bootstrapping. The processing unit is further adapted to identify an access router implementing functionality of a mobile access gateway in the access network to which the mobile node is attached based in the information received by the receiver during bootstrapping, and the transmitter is adapted to request the access router to advertise the home address prefix to the mobile node in said router advertisement.

According to another embodiment, the receiver is adapted to receive a proxy binding update from the access router to register the access router's IP address as a proxy care-of address for the mobile node's home address prefix at the packet data network gateway.

A further aspect of the invention is the implementation of the proposed methods in software and/or hardware components. Accordingly, a further embodiment of the invention relates to a computer readable medium storing instructions that, when executed by a processing unit of a mobile node, cause the mobile node to establish an additional session via a connection to a packet data network in a mobile communication network, by, in response to trigger to establish the additional session via the packet data network connection, bootstrapping with a packet data network gateway to thereby obtain an home address prefix from the packet data network gateway, wherein the packet data network gateway connects the mobile node to the packet data network, wherein the mobile node uses an IP address configured at the mobile node prior to the trigger to establish the session as its identifier during bootstrapping, tunnelling IP data packets of said additional session to the packet data network gateway using the IP address configured at the mobile node prior to the trigger to establish the session as the source address of the IP header encapsulating the IP data packets of the additional session, receiving a router advertisement from an access router, wherein the router advertisement is advertising an address prefix identical to the home address prefix obtained by the mobile node through bootstrapping with the packet data network gateway, and, in response to receiving the router advertisement, transmitting IP data packets of said additional session to the packet data network gateway using a home address configured according to the home address prefix as the source address of the IP data packets of the session.

Another embodiment of the invention relates to a computer readable medium storing instructions that, when executed by a processing unit of a packet data network gateway, cause the packet data network gateway to connect a mobile node to a packet data network, by bootstrapping with the mobile node, wherein bootstrapping comprises determining a home address prefix for the mobile node, transmitting the home address prefix to the mobile node, and receiving information on the access network to which the mobile node is currently attached, identifying an access router implementing functionality of a mobile access gateway in the access network to which the mobile node is attached based in the information received during bootstrapping, and requesting the access router to advertise the home address prefix to the mobile node in said router advertisement.

Generally, the invention also provides a computer readable medium storing instructions that, when executed by a processing unit of a mobile node, cause the mobile node to establish an additional session via a connection to a packet data network in a mobile communication network, by performing the steps of the method according to one of the various embodiments of the invention described herein.

BRIEF DESCRIPTION OF THE FIGURES

In the following, the invention is described in more detail in reference to the attached figures and drawings. Similar or corresponding details in the figures are marked with the same reference numerals.

DETAILED DESCRIPTION OF THE INVENTION

Figure 1:
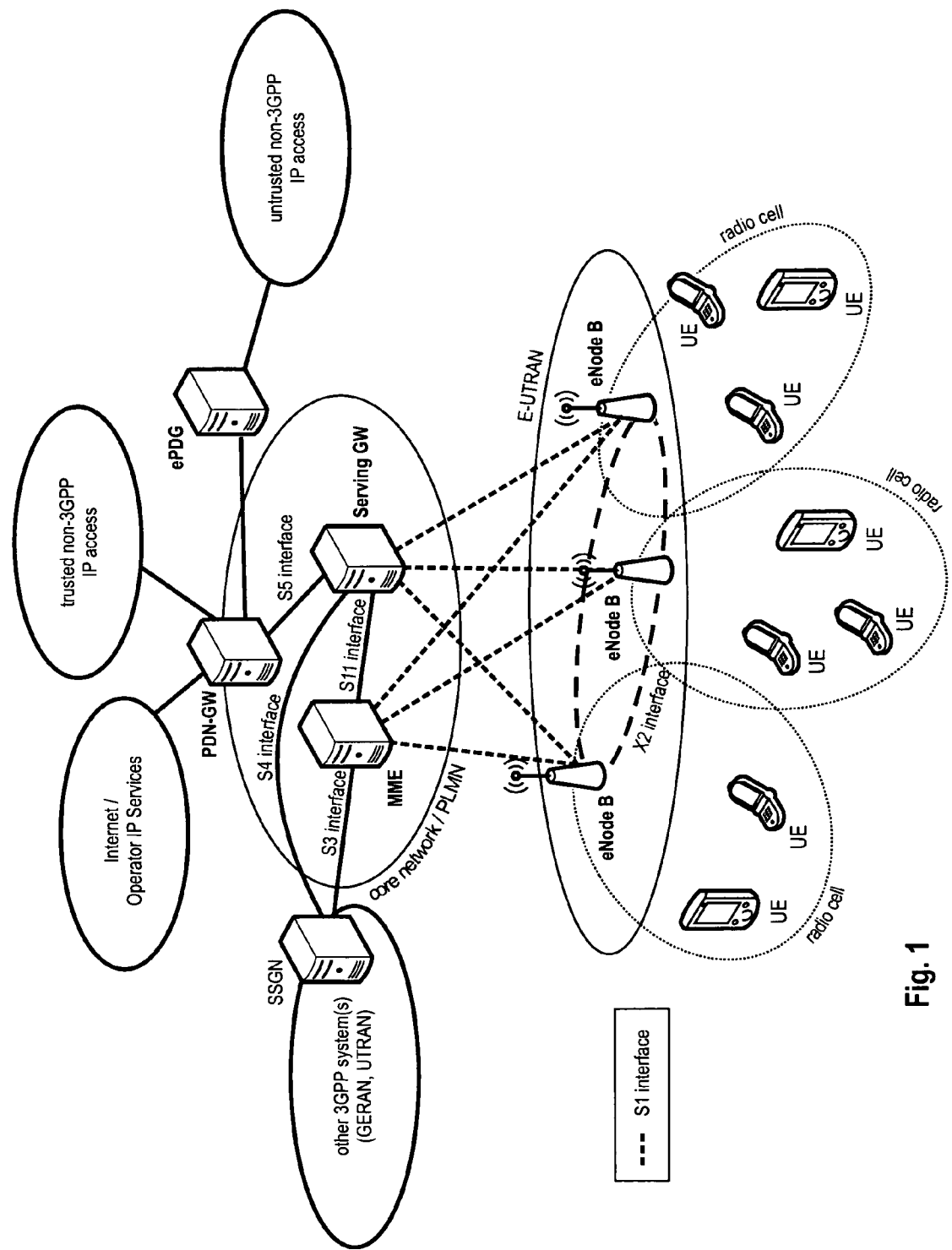
FIG. 1 shows an exemplary architecture of a 3GPP LTE system.

The following paragraphs will describe various embodiments of the invention. For exemplary purposes only, most of the embodiments are outlined in relation to an (evolved) communication system according to LTE discussed in the Technical Background section above and use terminology of the 3GPP and IETF. Please note that the terms mobile node (MN) and user equipment (UE) are interchangeable terms.

One aspect of the invention is to optimize the home link detection of a mobile node (i.e. user equipment or UE in the 3GPP terminology) by delaying the decision on whether the mobile node is located on the home link or not. As described above, in conventional home link detection, the mobile node checks before sending any binding update on an access interface whether its prefix of the local IP address configured is matching a home address prefix received during bootstrapping.

According to one aspect of the invention, this home link detection is delayed in that home link detection is based on comparing a home address prefix associated with the PDN connection and received during bootstrapping and the advertised local prefix of a router advertisement received after bootstrapping. In accordance with this aspect of the invention, a mobile node may for example have already configured a local IP address and obtains a trigger to establish a new session, respectively a new PDN connection. A local prefix can be either defined as an address prefix advertised in the access network or—from a mobile node's point of view—as an address prefix associated to the access interface used to connect the mobile node to a given access network.

In response to this trigger the mobile node starts a bootstrapping procedure with a mobility anchor in the core network, e.g. a packet data network gateway that connects the mobile node to the PDN of the new PDN connection. During this bootstrapping procedure, the mobile node is provided with a home address prefix, respectively a home address that is used for mobility management at the mobility anchor. Furthermore, since the mobile node already configured an IP address on its interface to the access network, this IP address can be used by the mobile node in the bootstrapping procedure.

It should be noted that in one example, bootstrapping is understood as DSMIPv6 bootstrapping with a home agent (HA). The functionality of such home agent or local mobility anchor is assumed to be implemented in the packet data network gateway connecting the mobile node to a given PDN. Accordingly, a skilled reader will recognize that when referring to a packet data network gateway (PDN-GW) in this document, a routing function as well as a mobility management function is assumed to be implemented in this network node.

For the proper functioning of the invention, the relevant steps of the bootstrapping procedure are the mobile node discovering its mobility anchor in the fixed network part and the mobile node obtaining a home address, i.e. an identifier that is used for mobility management for the given session/PDN connection. For example, in the above mentioned case of using DSMIPv6 bootstrapping, the mobile node discovers its home agent (e.g. packet data network gateway) for the new session/PDN connection and obtains its home address from the home agent. The home address is thereby provided by means of a home network prefix that allows the mobile node to configure its home IP address. Furthermore, as authentication of the mobility related signalling (like binding updates and binding acknowledgements) is a feature of the mobility management of CMIP, the bootstrapping with the home agent also negotiates the authentication parameters of the mobile node and the home agent, i.e. by means of IKEv2.

Generally, it is not required to use DSMIPv6 bootstrapping. In another example, the mobile node could for example also use a signalling mechanisms specific to the access network/access technology or, in another alternative, could use DHCP or specific/modified router advertisements to establish an additional session via a connection to a packet data network in a mobile communication network. As indicated above, the only requirement to such procedure would be that a mobility anchor for the given session/PDN connection is discovered and selected, that the mobile node can negotiate authentication/security related parameters required for the mobility management (if applicable) and that the mobile node can obtain some identifier that is used as a reference in the mobility management procedures, For example, the mobile node could use a DHCP information message (including, for example, a mobile node identifier and an APN) to request connectivity to an additional PDN and the DHCP server triggers a MAG in the access network to establish the connection to the additional PDN via PMIP.

As also indicated above, another issue is how the mobile node detects whether it is "at home" for a given identifier obtained during bootstrapping or not. For example in case of state-of-the-art DSMIPv6 bootstrapping, the mobile node is not informed during bootstrapping, whether the IP address configured according to the home network prefix obtained from the home agent can be used in the access network.

As proposed above, the mobile node may determine whether the IP address configured according to the home network prefix can be used on the local link by comparing the home network prefix to the prefix advertised in a router advertisement on the access network after receiving the home network prefix. If the advertised prefix is corresponding to the home network prefix, the mobile node can conclude that it is on the home link.

Generally, there are also other options how the mobile node detects whether it is "at home", i.e. on the home link, or not. In another example, the bootstrapping procedure could be modified so that the home agent (e.g. packet data network gateway) can indicate to the mobile node, whether an IP address configured according to the home network prefix can be used on the local link (i.e. the mobile node is "at home" for this prefix) or not. In case of using other mechanisms than DSMIPv6 bootstrapping, the alternative signalling procedures can foresee a similar feature of informing the mobile node that the identifier used for mobility management with the mobility anchor can be used on the local link.

In the above described embodiments of the invention, it may happen that the mobile node obtains its home network prefix prior to an indication whether or not an IP address configured according to the home network prefix can be used on the local link. Let's assume that the use of network-based mobility management (e.g. PMIP) is preferred over client-based mobility management (e.g. CMIP). Using the main aspects of the invention, the mobile node can start its new session upon having received the home network prefix from the home agent. For this purpose, the mobile node could register its previously obtained, valid local address as the care-of address for the home address according to the home network prefix with the home agent, and may immediately start data transfer of session data by tunnelling the packets to the home agent as if it was located on a foreign link (i.e. the mobile node tunnels the IP packets of the session by encapsulating with an IP header indicating the previously obtained, valid link local address as the source address and adding a message authentication code in a IP header option). Once, the mobile node detects that it is on the home link for the home network prefix, the mobile node can stop tunnelling the session data and can send the IP data packets of the session using the home address configured according to the home network prefix as the source address.

In comparison to the conventional behaviour of a mobile node this implies less delay for establishing the new session: conventionally, the mobile node would first obtain a new IP address for a new session/PDN connection, which requires at least one round-trip-time, then bootstraps with the home agent to obtain a home address to subsequently compare the new IP address for the new session/PDN connection with the home network prefix to determine, which IP address to use for the session. Thereafter, the mobile node would start the session. Hence, the procedure according to one aspect of the invention will reduce the time for starting the session significantly.

Figure 2:
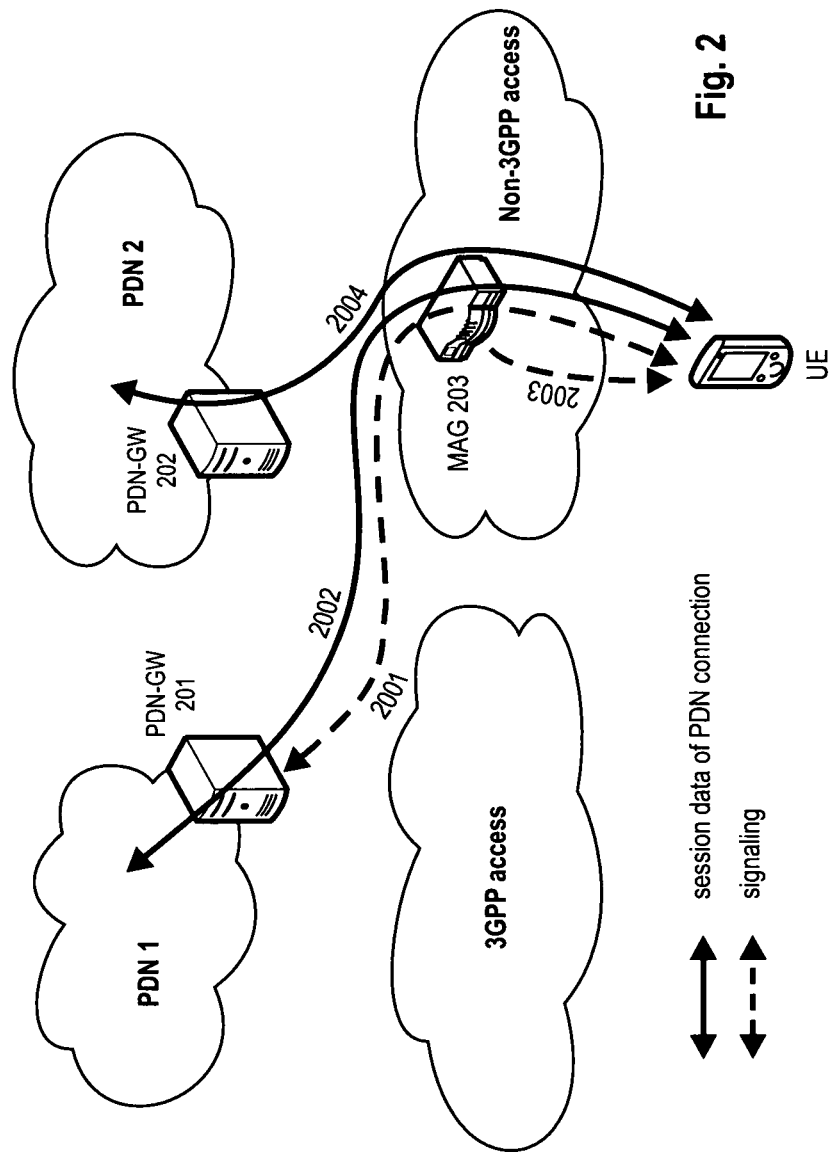
FIG. 2 shows an exemplary communications network with different access networks and PDNs, where a mobile node (UE) is establishing an additional session/PDN connection.
Figure 3:
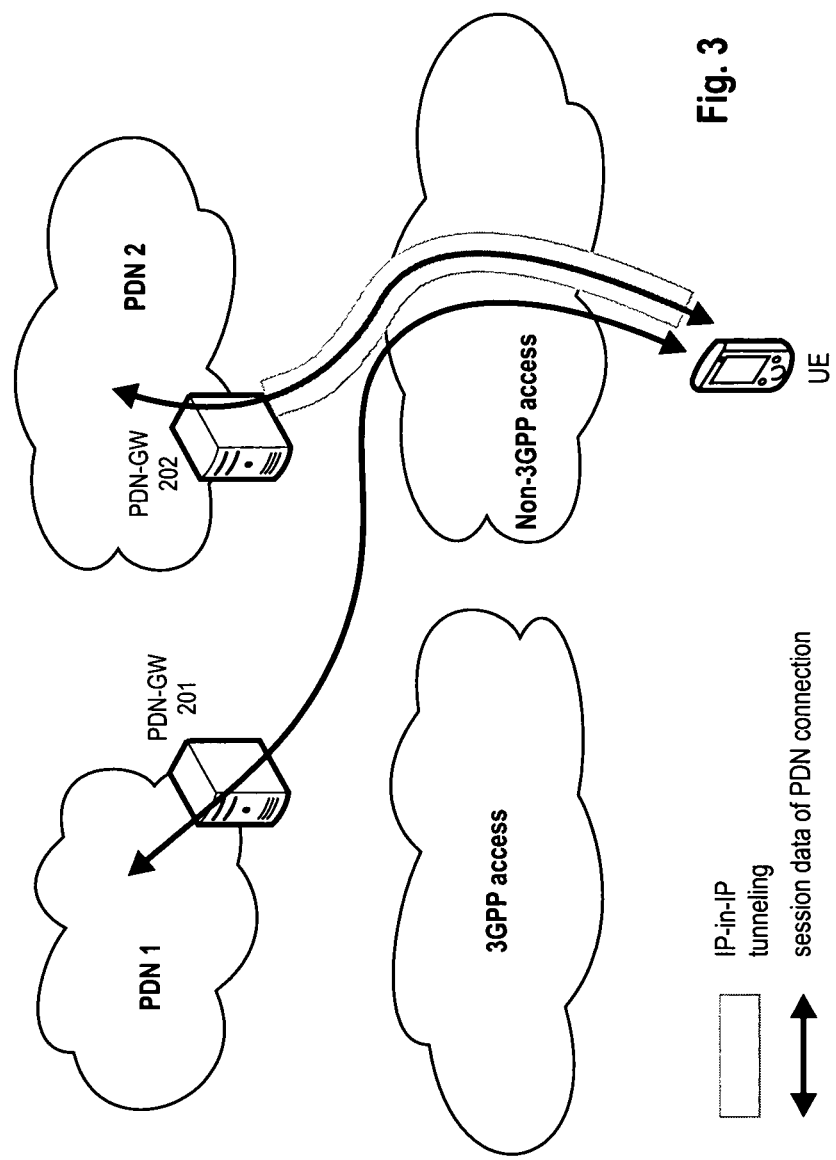
FIG. 3 shows the exemplary communications network of FIG. 2, and the resulting tunneling of session data for the established additional session/PDN connection.
Figure 4:
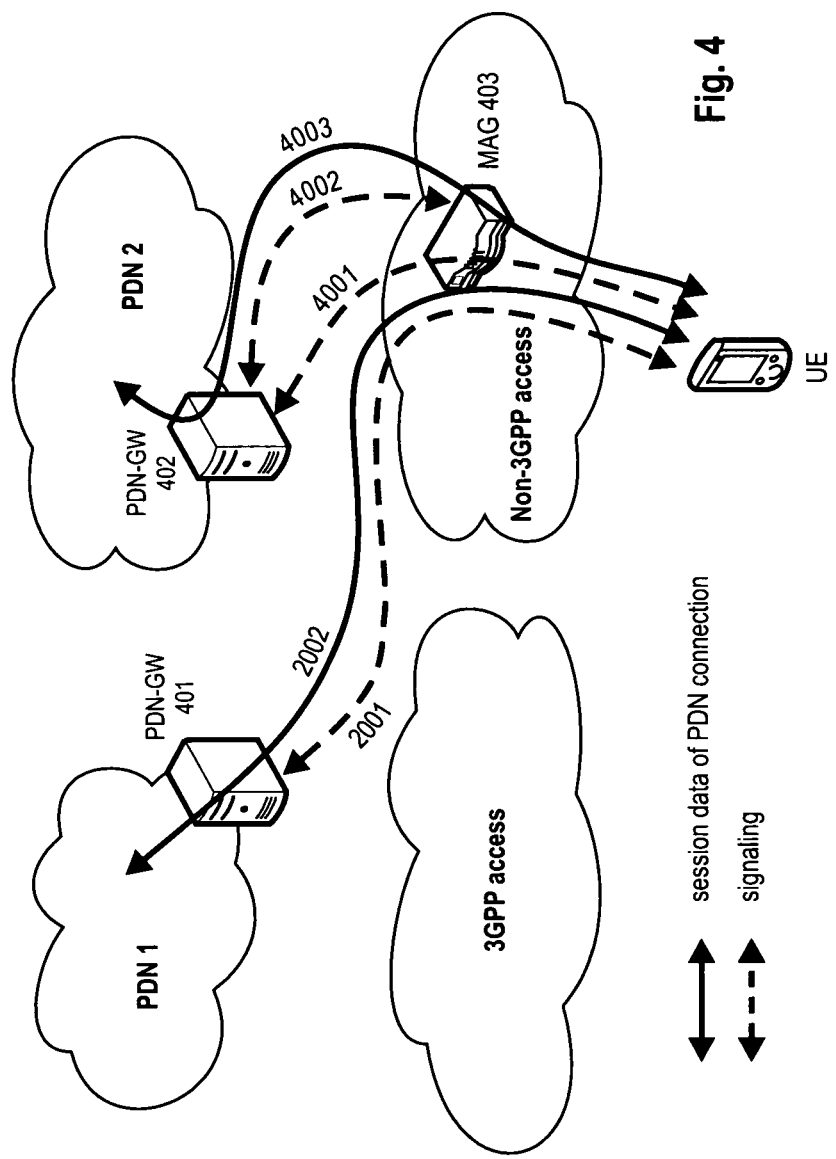
FIG. 4 shows an exemplary communications network with different access networks and PDNs according to one embodiment of the invention, where a mobile node (UE) is establishing an additional session/PDN connection and uses an optimized home link detection.

FIG. 4 shows an exemplary establishment of an additional session/PDN connection (PDN 2) by a mobile node using an optimized home link detection according to an exemplary embodiment of the invention. In this embodiment of the invention, it is exemplarily assumed that the mobile node is using DSMIPv6 and is attached to an access network (Non-3GPP access). Further, it is assumed that the mobile node has configured a valid IP address on its interface to its current access network and has optionally already established 2001, 2002 another PDN connection to packet data network PDN 1 through a packet data gateway (PDN-GW 401)—as described in connection with FIG. 2 above. In response to a trigger to establish a new (additional) PDN connection to a packet data network, bootstrapping 4001 with the PDN-GW serving as the mobility anchor for the new PDN connection is initiated by the mobile node. In the example shown in FIG. 4, PDN-GW 402 serves as the mobility anchor/home agent for the new PDN connection to packet data gateway PDN 2. PDN-GW 402 uses the mobile node's local IP address as key in a request to a database that is configured with a list of local IP addresses/prefixes and appropriate non-3GPP access networks that support home link, i.e. are capable of offering a network-based mobility management scheme like PMIP or GTP tunneling. The reply from the database contains the information whether home link is possible and it may provide additional information like an identifier of the non-3GPP access or a node in the non-3GPP access (e.g. an AAA proxy). In case home link is possible, PDN-GW 402 contacts the non-3GPP access (e.g. via AAA signalling and using the additional information like a contact node in the non-3GPP access) and triggers 4002 the non-3GPP access (e.g. MAG 403) to establish a PMIP-based tunnel with PDN-GW 402. When the tunnel between the non-3GPP access and PDN-GW 402 is established, PDN-GW 402 informs the mobile node within an IKEv2 signaling message that home link is possible and that a home address configured according to the home network prefix communicated in the bootstrapping can be used on the local link. As home link is possible for the new established 4003 PDN connection, the mobile node can configure an IP address according to the home network prefix and use this IP address for exchanging session data of the new PDN connection without adding any additionally overhead by IP-in-IP tunneling as outlined with respect to FIG. 2 and FIG. 3 in the Technical Background section.

One potential problem that can arise in the exemplary embodiment described with respect to FIG. 4 above is that the network has to maintain a database of many (or even all)

possible local IP addresses or IP prefixes of non-3GPP accesses that support home link, which requires an undesirable huge administrative effort. A further potential problem is that the solution could cause a delay of the PDN connection establishment, because at first home link needs to be determined via the database request and then the mobile node needs to wait until the PMIP tunnel between the non-3GPP access and the PDN-GW is established and the final DSMIPv6 bootstrapping IKEv2 message is received to inform the mobile node on whether or not PMIP can be used or not.

Figure 5:
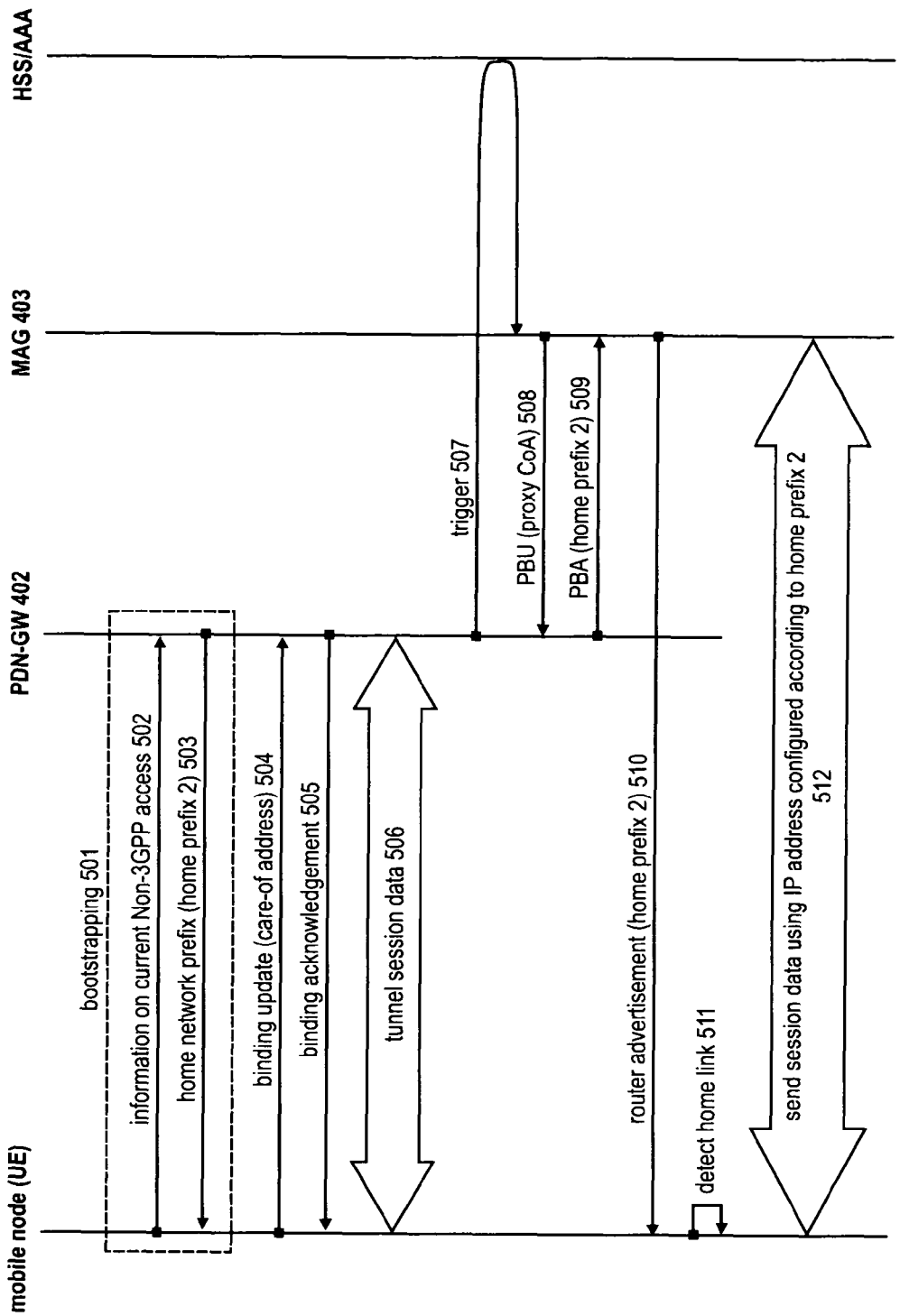
FIG. 5 shows an exemplary communications network with different access networks and PDNs according to another embodiment of the invention, where a mobile node (UE) is establishing an additional session/PDN connection and uses an optimized home link detection.

According to another embodiment of the invention those potential drawbacks of the solution can be overcome as follows. The improved establishment of a PDN connection setup according this embodiment of the invention is illustrated in FIG. 5. The mobile node initiates DSMIPv6 bootstrapping 501 using an IP address configured from a local prefix (can be a previous foreign prefix from the access router, if available, or a previous home prefix from PDN-GW 401) to establish an additional PON connection by first DSMIPv6 bootstrapping with a mobility anchor, here PDN-GW 402. In one of the signaling messages exchanged during DSMIPv6 bootstrapping, the mobile node may give 502 some information about the non-3GPP access (e.g. access technology, network identifier like WLAN SSID, AAA client identifier, AAA client IP address, etc) it is currently attached and optionally further the mobile node's capability to support home link to the PDN-GW 402. The information can for example be provided as configuration payload in an IKEv2 message or during authentication in IKEv2 as attribute in an EAP message. If the mobile node has performed 3GPP-based access authentication in the non-3GPP access, the information may be provided already during access authentication to the 3GPP AAA server.

The DSMIPv6 bootstrapping procedure provides 503 the mobile node with a home network prefix (home prefix 2). This home network prefix may be for example included in a signaling message of the IKEv2 protocol, e.g. as an IKEv2 configuration payload during IKE_AUTH exchange from the PDN-GW 402. Upon reception of the home network prefix, the mobile node registers 504 its IP address configured from a local prefix as the care-of address for the home address corresponding to the home network prefix by sending a binding update (BU) to PDN-GW 402, which is acknowledging 505 the update of the binding by a binding acknowledgement (BA). Thereafter, the DSMIPv6 tunnel can be used 506 for uplink/downlink IP data packets of the PDN connection to packet data network PDN 2.

With the information about the non-3GPP access provided by the mobile node during DSMIPv6 bootstrapping, PDN-GW 402 (or alternatively an AAA server) detects that home link is possible and should be used. Thus, PDN-GW 402 (or the AAA server) sends 507 a trigger to the non-3GPP access (e.g. via AAA signalling, involving an AAA server in the home network and an AAA proxy in the non-3GPP access), including for example the identity of the mobile node (MN-NAI), APN, home prefix or another identifier of the session/PDN connection. The trigger is routed to a mobile access gateway (MAG 403) in the non-3GPP access. It should be noted that the trigger can be sent by PDN-GW 402 as soon as the information about the non-3GPP access is received from the mobile node.

Based on the trigger from PDN-GW 402, MAG 403 in the Non-3GPP access sends 508 a proxy binding update (PBU) to PDN-GW 402 including the required parameters, such as mobile node identity (e.g. the NAI of the mobile node), APN to identify the session/PDN connection, home prefix (optional), and connection identifier (optional, may be used if the APN can not be unambiguously associated to the session/PDN connection). PDN-GW 402 updates its binding cache entry using the source address of the PBU as proxy care-of address and replies 509 with a proxy binding update acknowledgement (PBA) to MAG 403 including at feast the mobile node identifier and the home network prefix (home prefix 2).

In response to the proxy binding update, MAG 403 sends 510 a router advertisement to the mobile node to advertise the home network prefix (home prefix 2) to the mobile node on the local link. Upon reception of the router advertisement, the mobile node finally detects 511 that the home network prefix received during bootstrapping with PDN-GW 402 corresponds to the prefix advertised by MAG 403 (i.e. the mobile node is on the home link for the home network prefix). Accordingly, the mobile node can stop tunneling the session data to PDN-GW 402 and can exchange 512 session data using the IP address configured according to the home network prefix (home prefix 2). The mobile node sends the session data to MAG 403 using an IP address configured according to the advertised home prefix 2 and MAG 403 tunnels the session data to PDN-GW 402.

The benefit of this solution is that the mobile node can detect and change to home link without increased delay, even if an IP address configured according to foreign prefix was used for the DSMIPv6 bootstrapping. Further, there is no need to construct, maintain and request a database to detect the home link capability of the non-3GPP access.

In the two embodiments of the invention described above with respect to FIG. 4 and FIG. 5, it has been assumed that an IP prefix was allocated to the mobile node and that the mobile node configures an IP address from this prefix. However, it is also possible that directly an IP address is allocated to the mobile node and not a prefix. In this case the mobile node does not configure any additional IP addresses but uses only the directly allocated IP address.

Instead of DSMIPv6 bootstrapping it is also possible to use an access technology specific procedure to establish an additional PDN connection. Examples thereof are lower layer signalling, like NAS (non-access stratum) signalling in 3GPP access case, where a dedicated PDN connection establishment message for establishing the additional PON connection could be used, DHCP enhancements, or a specific/modified router solicitation, including additional information like the requested access point name. In case the mobile node is aware that an access technology specific procedure is supported in a non-3GPP access, it may prefer to use this procedure instead of DSMIPv6 bootstrapping, because it can be faster. As indicated above the alternative signaling procedures all ensure that the mobile node is provided with a home network prefix or home address that can be used for mobility management of the session (PDN connection). The respective mobility anchor could be for example obtained by the mobile node through one of the alternative signaling procedures or via a DNS request.

In some access networks the mobile node might not know whether an access technology specific procedure is supported. The mobile node could therefore try several possible access technology specific procedures to detect support via trial and error. Alternatively, the mobile node might try to use DSMIPv6 bootstrapping and if PDN-GW 402 detects based on the local address used by the mobile node that home link is possible in the non-3GPP access network, PDN-GW 402 could reject bootstrapping with an error code indicated that an access technology specific procedure can be used to obtain the necessary parameters for a network-based mobility management for the PDN connection. Based on the error code, the mobile node detects to use the access technology specific procedure and could use same to establish the session (PDN connection).

The trial-and-error-scheme and the rejection of the initial DSMIPv6 bootstrapping and use of an access technology specific procedure as described above may imply an additional delay to the session establishment to a packet data network One alternative to always trying to use an access technology specific procedure or always trying DSMIPv6 bootstrapping, in case the mobile node is not sure of the supported bootstrapping mechanism, the mobile node may use some hints to determine, which mechanism to use first.

The hints used for the determination could be for example:
If the already assigned prefix is a home network prefix or a foreign prefix:
Foreign prefix may give a hint to try DSMIPv6 bootstrapping first.
Home network prefix may give a hint to try access technology specific bootstrapping first.
The technology of the access network the mobile node is connected to:
Does it support the access technology specific procedures in general?
The PLMN the mobile node is/wants to connected to:
The mobile node may be pre-configured or may have history information from previous connections.
The PDN the mobile node wants to connect to:
The mobile node may be pre-configured or may have history information from previous connections.

However, it should be noted that these hints do not unambiguously determine the correct bootstrapping procedure. In case DSMIPv6 bootstrapping was selected, there are no significant delays to be expected, as one can assume DSMIPv6 bootstrapping to be always possible. In case the access technology specific procedure was selected, there is still the issue of the trial and error delay problem. In order to overcome this, the mobile node could start a very short timer and if the access technology specific procedure does not succeed before expiry, it starts the DSMIPv6 bootstrapping procedure.

In the access technology specific PDN connection establishment procedure described above, it could be assumed that home link detection is also part of the procedure. However, this might not be always true, i.e. the signalling of the request for establishment of an additional PDN connection might be decoupled from the home link detection procedure. In this case, the additional PDN connection procedure would trigger a router advertisement with a new prefix, but from the prefix alone, the mobile node does not know if it is a home network prefix or a foreign prefix.

One example where the additional PDN connection establishment procedure is decoupled from home link detection is in case of 3GPP access. Here, NAS signalling is used to setup an additional PDN connection, but the information about home link in the Protocol Configuration Option (PCO) during the NAS signalling is optional and DSMIPv6 bootstrapping can be used instead.

In further embodiment of the invention, the mobile node can use at least one of the following hints to detect whether an advertised prefix indicated home link or not. One possible hint for the mobile node to guess that a new prefix is indicating a home link is that the first 48 bit of the new prefix are the same as in the previous home network prefix. On the other hand, if the new prefix is completely different from the previous home network prefix, the mobile node could conclude that the new prefix is a foreign prefix. Another possibility is that the router advertisements for the different prefixes have different source addresses and therefore, the mobile node can assume that one router advertisement is sent from a MAG and the other one is sent from a "simple" access router.

However, above hints are not reliable. Therefore, according to another embodiment of the invention, the following mechanism can be used to inform the mobile node about home link without changing existing protocols but only modify the mobile node and network behavior: The non-3GPP access advertises a new prefix (home prefix 2) in reply to the access technology specific additional PDN connection procedure performed by the mobile node. If the non-3GPP access is not able to provide home link to the mobile node and the mobile node has to do DSMIPv6 bootstrapping to get a home network prefix for a new PDN connection (home prefix 2), the non-3GPP access sets the prefix 2 equal to the already assigned home prefix 1. On the other hand, if the non-3GPP access is able to provide home link to the mobile node and the mobile node needs not to do bootstrapping, the non-3GPP access sets prefix 2 equal to home prefix 2 (i.e. the new prefix received from PDN-GW 402).

There are some problems with this mechanism. At first, the mobile node may receive a router advertisement with the home network prefix (home prefix 1) for a first PDN connection (e.g. PDN connection 2002 in FIG. 4) periodically, if it is on home link for this PDN connection. If the mobile node is establishing an additional PDN connection and receives an router advertisement with the home prefix 1, it does not know whether the advertised home prefix 1 is sent to tell the mobile node that it is not on home link for the additional PDN connection as well, or if the advertisement is sent periodically for the first PDN connection 1. Thus, the mobile node may erroneously conclude that it is not on the home link for additional PDN connection 2 because it has received the periodic router advertisement with home prefix 1 for PDN connection 1.

A second problem is that the mechanism must be available in all non-3GPP accesses that support the access technology specific additional PDN connection procedure, because the mobile node always assumes to be on the home link for a new PDN connection, if the new prefix is different from any existing home network prefix.

To overcome the first problem, a point-to-point link could be used between the mobile node and the MAG/AR for every PDN connection of the mobile node. In this case the router advertisements are received via different point-to-point links and thus the mobile node can distinguish the PDN connections for which a respective router advertisement is received. Another solution to this first problem is that the router advertisement from the MAG/AR includes a home network prefix for each PDN connection of the mobile node. For example, in case the mobile node is not on the home link for PDN connection 2, the router advertisement would include the home prefix 1 twice, i.e. for PDN connection 1 and or PDN connection 2.

To overcome the second problem mentioned above according to another embodiment of the invention, the mobile node detects whether a home link detection mechanism is supported or not. In order to differentiate non-3GPP accesses that support a home link detection mechanism from those that don't, the following one or more of the following mechanism could be used:
The mobile node sends two router solicitations in parallel with the access technology specific additional PDN connection request. Both router solicitations have different source addresses, but based on the same previously assigned prefix.
If the non-3GPP access supports the described mechanism, an access router in the non-3GPP access sends different unicast router advertisements back to the mobile node, if at least one link is home link.

The mobile node determines whether or not it is on the home link based on the router advertisements sent back to the mobile node. For example if:

both router advertisements include the same previously assigned prefix based on which the two IP addresses for the two router solicitations have been based (old prefix), it follows that the mobile node is on foreign link with both PDN connections.

one router advertisement includes the old prefix and the other router advertisement includes the old and a new prefix, it follows that the mobile node is on foreign link with the old and on home link with the new PDN connection.

one router advertisement includes a new prefix and the other router advertisement includes the old and a new prefix, it follows that the mobile node is on home link with the old and on foreign link with the new PDN connection.

one router advertisement includes the old prefix and the other router advertisement includes a new prefix, it follows that the mobile node is on home link with both PDN connections.

Another embodiment of the invention relates to the implementation of the above described various embodiments using hardware and software. It is recognized that the various embodiments of the invention may be implemented or performed using computing devices (processors) that are suitably controlled by executable instructions that cause the computing device to perform the functions according to the different embodiments of the invention described herein. A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Most of the embodiments have been outlined in relation to a 3GPP-based architecture of a communication system and the terminology used in the previous sections mainly relates to the 3GPP terminology and the terminology used within the IETF. However, the terminology and the description of the various embodiments with respect to 3GPP-based architectures and using IETF specific language are not intended to limit the principles and ideas of the inventions to such systems only.

Also the detailed explanations given in the Technical Background section above are intended to better understand the mostly 3GPP and IETF specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE RAN currently discussed by the 3GPP.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

The invention claimed is:

1. A method for establishing by a mobile node an additional session via a connection to a packet data network in a mobile communication network, the mobile node being attached to an access network, the method comprising:

bootstrapping, in response to a trigger to establish the additional session via the packet data network connection, with a packet data network gateway to thereby obtain a home address prefix from the packet data network gateway, wherein the packet data network gateway connects the mobile node to the packet data network, wherein the mobile node uses an IP address configured at the mobile node for the access network prior to the trigger to establish the additional session as its identifier during bootstrapping, tunneling IP data packets of said additional session to the packet data network gateway using the IP address configured at the mobile node prior to the trigger to establish the additional session as the source address of the IP header encapsulating the IP data packets of the additional session, receiving after bootstrapping a router advertisement advertising an address prefix from an access router and comparing the advertised address prefix to the home address prefix obtained by the mobile node through bootstrapping with the packet data network gateway to perform a home link detection, wherein, in case the router advertisement is advertising an address prefix identical to the home address prefix obtained by the mobile node through bootstrapping with the packet data network gateway, the mobile node is transmitting, in response to receiving the router advertisement, IP data packets of said additional session to the packet data network gateway using a home address configured according to the obtained home address prefix as the source address of the IP data packets of said additional session, stopping tunneling IP data packets of said additional session to the packet data network gateway, and wherein the home address configured according to the obtained home address prefix is different from the IP address configured for the access network prior to the trigger to establish the additional session.

2. The method according to claim 1, further comprising configuring at an interface of the mobile node and prior to the trigger to establish the additional session the IP address according to a local prefix advertised in a router advertisement.

3. The method according to claim 1, further comprising checking whether the prefix of the IP address configured at the mobile node prior to the trigger to establish the connection and being used for bootstrapping is matching the home address prefix obtained from the packet data network gateway during bootstrapping, and wherein tunneling of the IP data packets of the additional session are only tunneled to the packet data network gateway, if the IP address configured at the mobile node prior to the trigger to establish the connection is not matching the home address prefix obtained from the packet data network gateway during bootstrapping.

4. The method according to claim 1, wherein the bootstrapping procedure includes an Internet Key Exchange Version 2 (IKEv2) signaling procedure to establish a security association between the mobile node and the packet data network gateway for tunneling the IP data packets of said additional session between the mobile node and the packet data network gateway.

5. The method according to claim 4, wherein the mobile node is receiving the home address prefix from the packet data network gateway as part of the IKEv2 signaling procedure.

6. The method according to claim 1, wherein the access router is implementing functionality of a mobile access gateway in the access network the mobile node is currently attached.

7. The method according to claim 1, wherein bootstrapping comprises transmitting from the mobile node information on the access network to which the mobile node is currently attached to the packet data network gateway.

8. The method according to claim 7, further comprising identifying the access router implementing functionality of a mobile access gateway in the access network and requesting the access router to advertise the home address prefix to the mobile node in said router advertisement.

9. The method according to claim 8, further comprising transmitting a proxy binding update from the access router to the packet data network gateway to register the access router's IP address as a proxy-care-of address for the mobile node's home address prefix at the packet data network gateway.

10. The method according to claim 1 further comprising registering the IP address configured at the mobile node prior to the trigger to establish the connection as the care-of address of the mobile node at the packet data network gateway in response to determining that said home address is not matching the home address prefix obtained from the packet data network gateway.

11. The method according to claim 1, wherein the mobile node has established a further session via another connection to another packet data network prior to obtaining said trigger to establish the additional session, and wherein a client-based mobility management scheme is used for said further session via said another packet data network connection and a network-based mobility management scheme is used for said session.

12. The method according to claim 1, wherein the mobile node receives the router advertisement subsequent to the bootstrapping step and the mobile node compares the home address prefix with the address prefix received during the router advertisement to perform a home link detection.

13. A method for establishing by a mobile node an additional session via a connection to a packet data network in a mobile communication network, the mobile node being attached to an access network, the method comprising:

bootstrapping, in response to a trigger to establish the additional session via the packet data network connection, with a packet data network gateway to thereby obtain a home address prefix from the packet data network gateway, wherein the packet data network gateway connects the mobile node to the packet data network, wherein the mobile node uses an IP address configured at the mobile node for the access network prior to the trigger to establish the additional session as its identifier during bootstrapping, receiving after bootstrapping an indication whether the home address prefix obtained from the packet data network gateway can be used in the access network to which the mobile node is attached, if the IP address configured according to the home address prefix obtained from the packet data network gateway cannot be used in the access network, tunneling IP data packets of said additional session to the packet data network gateway using the IP address configured for the mobile node as the source address of the IP header encapsulating the IP data packets of the additional session, and if the IP address configured according to the home address prefix obtained from the packet data network gateway can be used in the access network, transmitting IP data packets of said additional session to the packet data network gateway using a home address configured according to the obtained home address prefix as the source address of the IP data packets of the additional session without tunneling IP data packets of said additional session to the packet data network gateway, and wherein the home address configured according to the obtained home address prefix is different from the IP address configured for the access network prior to the trigger to establish the additional session.

14. The method according to claim 13, wherein the indication whether the home address prefix obtained from the packet data network gateway can be used in the access network is received as part of a message received by the mobile node during bootstrapping or as part of a message received by the mobile node when performing access network specific signaling to establish the additional session.

15. A mobile node for establishing an additional session via a connection to a packet data network in a mobile communication network, the mobile node being attached to an access network and having optionally established a first session via another connection to a different packet data network, the mobile node comprising:

a transmitter and a receiver for bootstrapping with a packet data network gateway in response to a trigger to establish the additional session via the packet data network connection to thereby obtain a home address prefix from the packet data network gateway, wherein the packet data network gateway connects the mobile node to the packet data network, wherein the mobile node uses an IP address configured at the mobile node for the access network prior to the trigger to establish the additional session as its identifier during bootstrapping, wherein the transmitter is configured to tunnel IP data packets of said additional session to the packet data network gateway using the IP address configured at the mobile node prior to the trigger to establish the additional session as the source address of the IP header encapsulating the IP data packets of the additional session, and wherein the receiver is configured to receive after bootstrapping a router advertisement advertising an address from an access router, and the mobile node is further configured to compare the advertised address prefix to the home address prefix obtained by the mobile node through bootstrapping with the packet data network gateway to perform a home link detection, wherein, in case the router advertisement is advertising an address prefix identical to the home address prefix obtained by the mobile node through bootstrapping with the packet data network gateway, the transmitter is further configured to transmit in response to receiving the router advertisement IP data packets of said additional session to the packet data network gateway using a home address configured according to the obtained home address prefix as the source address of the IP data packets of said additional session and to stop tunneling IP data packets of said additional session to the packet data network gateway , and wherein the home address configured according to the obtained home address prefix is different from the IP address configured for the access network prior to the trigger to establish the additional session.

16. The mobile node according to claim 15, further comprising an interface, wherein the mobile node is able to configure the interface with the IP address according to a local prefix advertised in a router advertisement prior to the trigger to establish the additional session.

17. The mobile node according to claim 15, further comprising a processor unit for checking whether the IP address configured at the mobile node prior to the trigger to establish the connection and being used for bootstrapping is matching the home address prefix obtained from the packet data network gateway during bootstrapping, and wherein the transmitter is configured to tunnel the IP data packets of the additional session to the packet data network gateway, only if the IP address configured at the mobile node prior to the trigger to establish the connection is not matching the home address prefix obtained from the packet data network gateway during bootstrapping.

18. The mobile node according to claim 15, wherein the transmitter is configured to transmit information on the access network to which the mobile node is currently attached to the packet data network gateway during bootstrapping.

* * * * *